United States Patent
Okuda et al.

[11] Patent Number: 5,883,709
[45] Date of Patent: Mar. 16, 1999

[54] INCLINATION MONITORING SYSTEM INCLUDING REFLECTION OF COLLIMATED LIGHT

[75] Inventors: Isao Okuda, Tokyo; Toshiyuki Kase, Kanagawa-ken; Hiroshi Nishikawa, Tokyo, all of Japan

[73] Assignee: Asahi Kogaku Kogyo Kabushiki Kaisha, Tokyo, Japan

[21] Appl. No.: 916,047

[22] Filed: Aug. 21, 1997

[30] Foreign Application Priority Data

Aug. 22, 1996 [JP] Japan ..................... 8-220890

[51] Int. Cl.$^6$ ............... G01B 11/26; G01C 1/00

[52] U.S. Cl. ........................................................
356/138; 356/375; 359/811; 250/201.4

[58] Field of Search ................. 356/138, 139.1, 356/37.5; 359/811, 813, 814, 819, 823; 369/44.14–44.16, 112; 250/201.4, 201.5

[56] References Cited

U.S. PATENT DOCUMENTS

| 5,553,052 | 9/1996 | Oona et al. | 369/112 |
| 5,742,383 | 4/1998 | Jeon | 356/138 |

Primary Examiner—Robert Kim
Attorney, Agent, or Firm—Greenblum & Bernstein, P.L.C.

[57] ABSTRACT

An inclination monitoring system for monitoring an inclination of a lens having a lens portion and a flange portion surrounding the lens portion with respect to a reference plane. The inclination monitoring system includes a light emitting system which emits a collimated light beam towards the lens. The light emitting system and the lens are arranged such that optical axes of the light emitting system and the lens form a first predetermined angle. The monitoring system is further provided with a light receiving system which receives light reflected by the lens. The light receiving system is arranged in a predetermined positional relationship with respect to the light emitting system and the lens. In particular, the collimated light beam illuminates an entire area of the flange portion.

10 Claims, 7 Drawing Sheets

INCLINATION MONITORING SYSTEM INCLUDING REFLECTION OF COLLIMATED LIGHT

BACKGROUND OF THE INVENTION

The present invention relates to an inclination monitoring system, which is used, for example, in a lens inclination adjustment apparatus.

Conventionally, a data recording/reproducing device using an optical disk as a recording medium is provided with an optical system which includes a light source and an objective lens held in a lens holder. A recording medium (i.e., an optical disk) is set at a focal point of the objective lens. The light source emits a parallel light beam which is focused by the objective lens to form a beam spot on the recording medium. The beam reflects on the recording medium, and is received by an optical pick-up device.

In the data recording/reproducing device, an optical axis of the objective lens preferably intersects the recording medium at right angles. If the optical axis is inclined with respect to a normal line to the recording medium, coma occurs, which may cause the beam spot formed on the recording medium to be wider than it should be. If the beam spot is wider, the density at which data is recorded to the recording medium will be lower. Further, if the beam spot is wider, when recorded data is read, a reproduced signal may include noise.

Recently, an optical system having a larger numerical aperture NA has been used for such a device. In this case, even a small inclination of the objective lens may greatly affect the size of the beam spot on the recording medium.

Accordingly, it is necessary to adjust the inclination of the objective lens such that an inclination angle formed between the optical axis of the objective lens and a line normal to the recording medium is within a permissible range, which is, for example, 3 minutes of arc.

In order to adjust the inclination of the objective lens, a lens inclination adjustment system is used. A conventional inclination adjustment system includes an interferometer unit and a lens inclination adjustment unit.

Firstly, at least a part of the data recording/reproducing device, including the optical system and the light source, is coupled with the interferometer unit and interference fringes are observed. A user may then determine the inclination angle and inclination direction (i.e., a direction of the inclination on a plane parallel to the surface of the recording medium and facing the objective lens) based on the observed interference fringes.

Next, at least a part of the data recording/reproducing device is coupled with the lens inclination adjustment unit and the lens is moved so that the inclination (i.e., the inclination angle and inclination direction) is adjusted to be in a permissible range in accordance with the inclination angle and the inclination direction which have been determined using the interferometer.

When the lens is moved (i.e., when the inclination of the lens is changed), it is necessary to monitor the change of the inclination, or current inclination, of the lens. An example of an inclination monitoring system employed in an inclination adjustment apparatus is shown in FIG. 1.

Generally, an objective lens 1 is molded and includes a lens portion 2 and a planar flange portion 3 surrounding the lens portion 2. Generally, monitoring of the inclination of the lens 1 is performed by emitting a light beam to the flange portion 3 and detecting the reflected beam.

As shown in FIG. 1, the monitoring system includes an He—Ne laser source 404 and a screen 407. The lens 1 is positioned approximately one meter away from the He—Ne laser source 404 and the He—Ne laser source 404 emits a narrow light beam P, having a diameter of 1–2 mm, towards the flange portion 3 of the lens 1 through an opening 409 formed on the screen 407. A reflected beam P', reflected by the flange portion 403, is incident on the screen 407. It should be noted that the flange portion 3 may be formed as a mirror surface to improve reflectivity.

The reflected beam P' is observed as an image on the screen 407, and a center of the image is regarded as a point where the optical axis of the reflected beam intersects the screen 407. The inclination of the lens 1 is then monitored with reference to the position of the center of the image formed by the reflected beam P' on the screen 407.

However, since the objective lens is made from a mold, the surface of the flat portion 3 is microscopically uneven and the image of the reflected beam is not a perfect beam spot. As shown in FIG. 2, the image may extend over a wide area, such as, in this example, approximately 26 minutes of arc. Accordingly, the center of the image of the reflected beam is difficult to identify, especially if the inclination of the lens 1 is changed during adjustment.

Further, part of the beam directed to the flange portion 3 may be incident on the lens portion 2, and a reflected beam from the lens portion 2 may form another spot or stray light on the screen 407, making it even more difficult to adjust the inclination of the lens 1.

FIG. 3 is an enlarged view of the lens portion 2. The lens portion 2 includes a first surface 2A, on which the laser beam P may be incident, and a second surface 2B, opposite to the first surface 2A. An optical axis O1 of the lens 1 and the first surface 2A intersect at a point 2C.

As shown in FIG. 3, depending on the diameter of the beam P, parts P1 and P2 of the beam P may be incident on the surface 2A at different distances from the optical axis O1. For this analysis, we assume that the beam P is parallel to the optical axis O1, i.e., such that an inclination angle $\phi$ of the beam P with respect to the optical axis O1 is zero. In fact, in the conventional inclination monitoring system, since the inclination of the lens 1 is to be adjusted, the beam P may form a small angle with the optical axis O1.

As shown in FIG. 3, the part P2 of the incident beam P is incident at an incident height (a distance between the optical axis O1 and the position where the part P2 is incident) h=1.7 mm. A portion of the part P2 travels through the lens portion 2, is reflected by the inner surface of the second surface 2B six times (total reflection), and is then emitted from the first surface (as stray light) at an emitting angle (an angle of the emitted beam with respect to the optical axis O1) $\Psi$ of approximately −3.0 degrees. Similarly, for the part P1 of the beam P, inclination angle $\phi=0$ and incident height h=1.6 mm, such that a portion of the part P1 is reflected by the second surface 2B three times and emitted from the first surface 2A at an emitting angle $\Psi$ of approximately 30 degrees.

FIG. 4 is a graph showing a relationship between the incident height h of the incident beam and the emitted angle $\Psi$. Note that, in this graph, the optical axes of the objective lens 1, the light monitoring device, and the incident beam are assumed to be parallel with each other. In the graph, a numeral in parentheses represents a number of times a portion of an incident beam is reflected by the second surface 2B. Thus, from the graph, it may be seen that a beam which is incident to the first surface 2A at an incident height between 1.14 mm through 1.46 mm is totally reflected twice by the second surface 2B and is emitted at an emitting angle Ψ between approximately 48 through −65 degrees. Further, a beam which is incident to the first surface 2A at an incident height of approximately 1.5 mm through 1.6 mm is reflected three times and is emitted at an emitting angle Ψ between approximately 30 through −40 degrees. Note that the emitting angle Ψ will vary according to the angle formed between the optical axis of the monitoring device and that of the lens 1 (i.e., depending on φ). Thus, the beam reflected by the second surface 2B may not be substantially attenuated and may be directed to the screen 407 as stray light, making it difficult to monitor the inclination of the lens 1. The above values are for a lens 1 having the following characteristics: a radius of curvature of the first surface 2A of approximately 4.5 mm; a radius of curvature of the second surface 2B of approximately −2.8 mm; a refractive index of approximately 1.54; and an effective diameter of approximately 3.3 mm.

As described above, it may be difficult to monitor the inclination of a lens precisely due to stray light caused by the lens itself.

SUMMARY OF THE INVENTION

It is therefore an object of the present invention to provide an improved inclination monitoring system by which the inclination of a lens can be monitored accurately.

According to an aspect of the present invention, there is provided, an inclination monitoring system for monitoring an inclination of a lens with respect to a reference plane for a lens having a lens portion and a flange portion surrounding the lens portion. The inclination monitoring system includes a light emitting system which emits a collimated light beam towards the lens such that an entire area of the flange portion is illuminated by the collimated light beam and a light receiving system which receives light reflected by the lens. The light emitting system forms a first predetermined angle with a normal to the reference plane and the light receiving system is arranged in a predetermined positional relationship with respect to the light emitting system and the reference plane.

Optionally, the first predetermined angle is greater than an allowable inclination range of the lens with respect to the reference plane.

Further optionally, an optical axis of the light receiving system may form a second predetermined angle with the normal to the reference plane. In a particular case, the second predetermined angle and the first predetermined angle may be substantially the same.

Still optionally, the light emitting system and the light receiving system may be arranged such that optical axes of the light emitting system and the light receiving system are arranged symmetrically with respect to the normal to the reference plane.

Furthermore, the light receiving system may have an image receiving device and a collimating lens, and the collimating lens may be arranged between the lens and the image receiving device to converge the light reflected by the lens onto the image receiving device.

Further optionally, the light receiving system may have an analyser and an ND (neutral density) filter. In this case, the analyser and the ND filter may be provided between the collimating lens and the image receiving device.

It is preferable that the image receiving device has an image receiving surface and inclination of the lens may be monitored by comparing a first position of the received light on the image receiving surface, when the lens has a first inclination, with another position of the received light on the image receiving surface, when the lens has a second inclination.

According to another aspect of the present invention, there is provided, an inclination monitoring system for monitoring an inclination of a lens with respect to a reference plane for a lens having a lens portion and a flange portion surrounding the lens portion. The inclination monitoring system includes a light emitting system which emits a collimated, or a parallel light beam towards the lens and a light receiving system which receives light reflected by the lens, and the light emitting system, the reference plane, the lens, and the light receiving system are arranged such that an amount of light totally reflected inside the lens that is incident to the light receiving system is reduced.

DETAILED DESCRIPTION OF THE PREFERRED EMBODIMENTS

A lens inclination monitoring system according to an embodiment of the invention is described with reference to the accompanying drawings.

Figure 5:
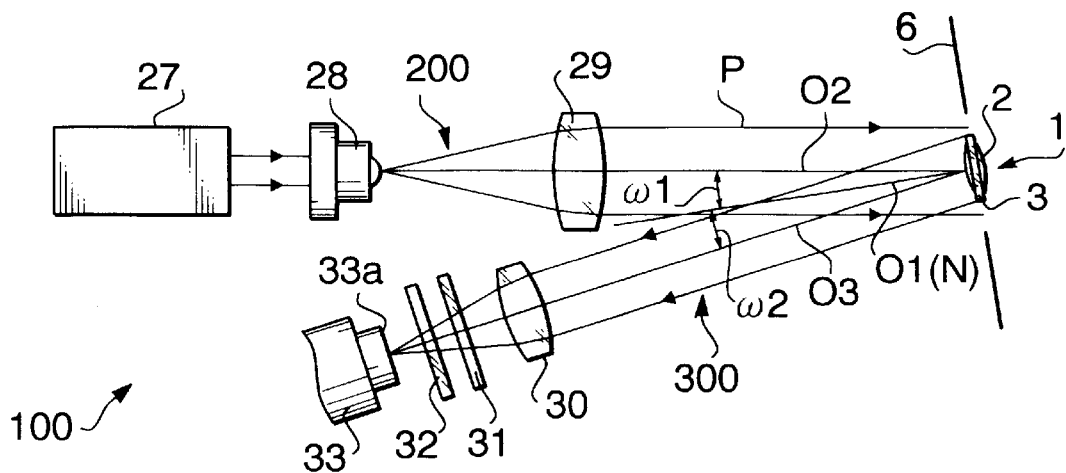
FIG. 5 is a diagram showing an arrangement of an inclination monitoring system embodying the invention.

FIG. 5 shows a schematic structure of an inclination monitoring system 100. The lens inclination monitoring system 100 includes a light emitting system 200, a light receiving system 300, and an objective lens 1 which is secured on an optical head or the like (not shown). The inclination monitoring system 100 is used when adjusting the inclination of the objective lens 1 so that an optical axis O1 of the objective lens 1 is perpendicular to a plane of a recording medium such as an optical disk (not shown). More specifically, using an interferometer (not shown), an inclination (i.e., an inclination direction and an inclination amount) with respect to the recording medium is detected for the objective lens 1 mounted on the optical head. Then, using the inclination monitoring system 100, the inclination of the objective lens 1 with respect to the optical head is changed so that the optical axis O1 is in a predetermined position with respect to the optical head. In other words, if the inclination of the objective lens 1 with respect to the optical head is appropriately changed, the optical axis O1 should intersect the recording medium at right angles. The objective lens 1 is unitarily formed with a lens portion 2 and a flange portion 3.

Figure 12:
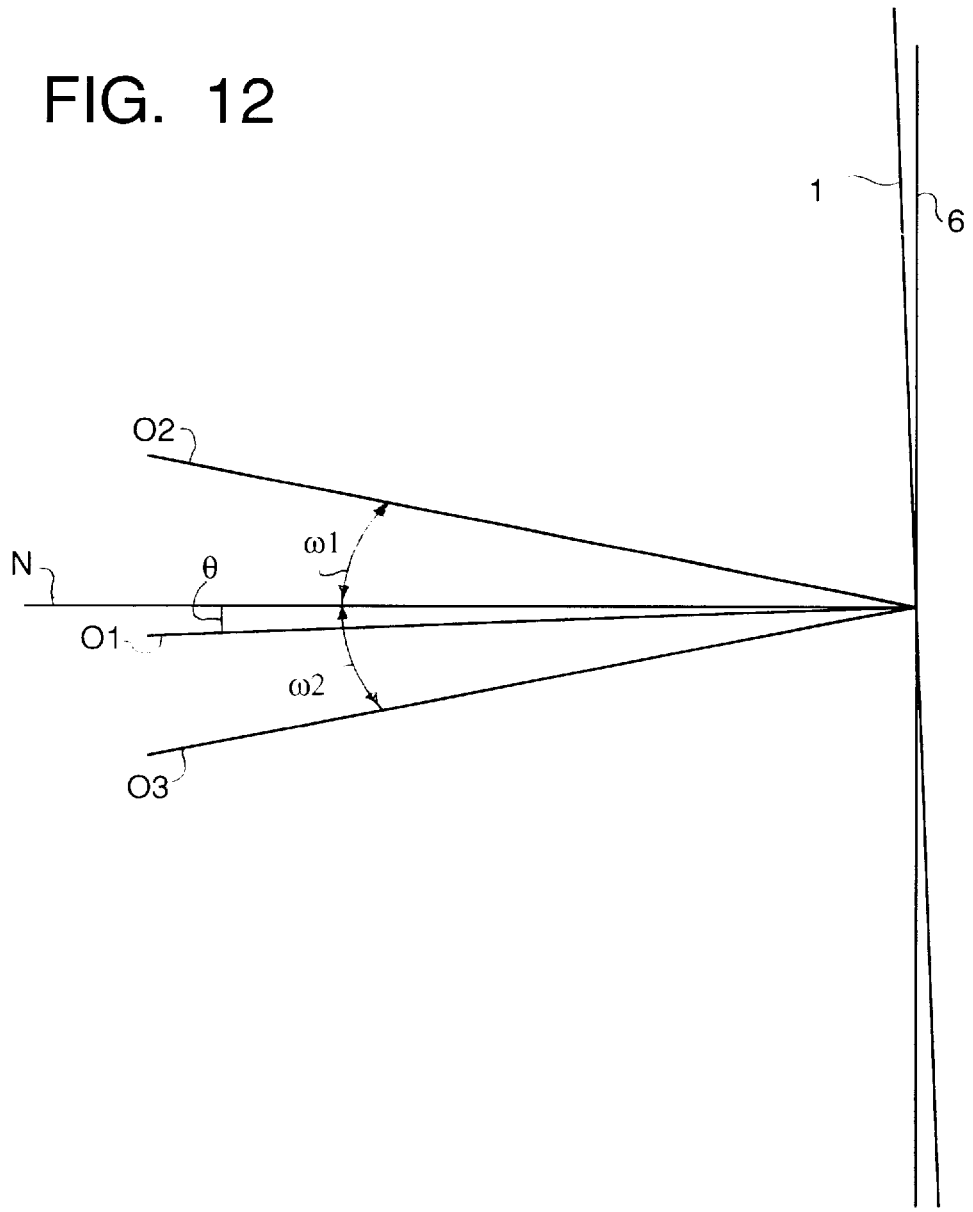
FIG. 12 is a schematic view illustrating an inclination of the objective lens.

In FIG. 5, a plane parallel to the recording medium is indicated by a reference plane 6, which is perpendicular to the page in FIG. 5. As shown in more detail in a schematic view in FIG. 12, the optical axis O1 of the objective lens 1 is offset by an inclination angle $\theta$ (i.e., the angle to be adjusted) with respect to a normal N to the reference plane 6. Further, as shown in FIGS. 5 and 12, a first angle $\omega 1$ is defined as an angle formed between an optical axis O2 of the light emitting system 200 and the normal N and a second angle $\omega 2$ is defined as an angle formed between an optical axis O3 of the light receiving system 300 and the normal N. The first angle $\omega 1$ and the second angle $\omega 2$ are preferably equal and the first angle $\omega 1$ is preferably greater than an allowable range of the inclination angle $\theta$. Further, note that, in this description, angles are measured with respect to the normal N, and indicated as a positive value when measured clockwise, and a negative value when measured counterclockwise. In the embodiment, the first angle $\omega 1$ is approximately -20 degrees and the second angle $\omega 2$ is approximately 20 degrees.

The light emitting system 200 includes an He—Ne laser source 27, a short-focal length lens 28 and a long-focal length lens 29. A laser beam emitted by the He—Ne laser source 27 is expanded and collimated by the combination of the short-focal length lens 28 and the long-focal length lens 29. Specifically, the lenses 27 and 29 are arranged such that the beam passes through the lenses 27 and 29, is expanded, and proceeds as a collimated beam (i.e., a parallel beam). In particular, a cross section of the expanded beam has a larger diameter than the diameter of the flange portion 3 of the objective lens 1 such that the collimated beam is incident on the entire area of the flange portion 3.

Figure 6:
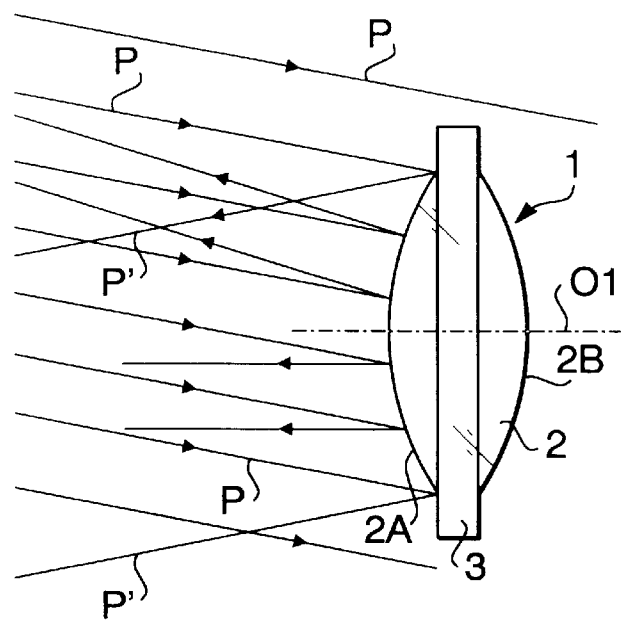
FIG. 6 is an enlarged view of an objective lens shown in FIG. 5.

As shown in an enlarged view in FIG. 6, the expanded and collimated beam P is projected to the objective lens 1 from a direction inclined by the first angle $\omega 1$ with respect to the normal N of the reference plane 6. The beam P is reflected by the flange portion 3 and a first surface 2A of the lens portion 2 and at least a part of a reflected beam P' is directed to the light receiving system 300. Note that the flange portion 3 has a flat surface, and accordingly the light reflected by the flange portion 3 is also a parallel beam.

The light receiving system 300 includes a collimating lens 30, an optical analyser 31, an ND (neutral density) filter 32, and an imaging element 33. The ND filter 32 is a filter which has a flat characteristic for all colors of incident light, i.e., affects all wavelengths equally. The ND filter 32 and the optical analyser 31 are provided to prevent stray light (as described herein) from reaching the imaging element 33 and thereby prevent saturation of the imaging element 33 by the stray light.

The reflected beam P', which is a parallel beam, is converged by the collimating lens 30, such that a spot is formed on the imaging element 33. Then, the position of the spot is detected using the imaging element 33. Specifically, a change in inclination of the objective lens 1 can be detected by comparing a first position of the spot when the objective lens 1 is directed to a first orientation with a second position when the objective lens is directed to a second orientation as a result of the movement thereof.

Figure 7:
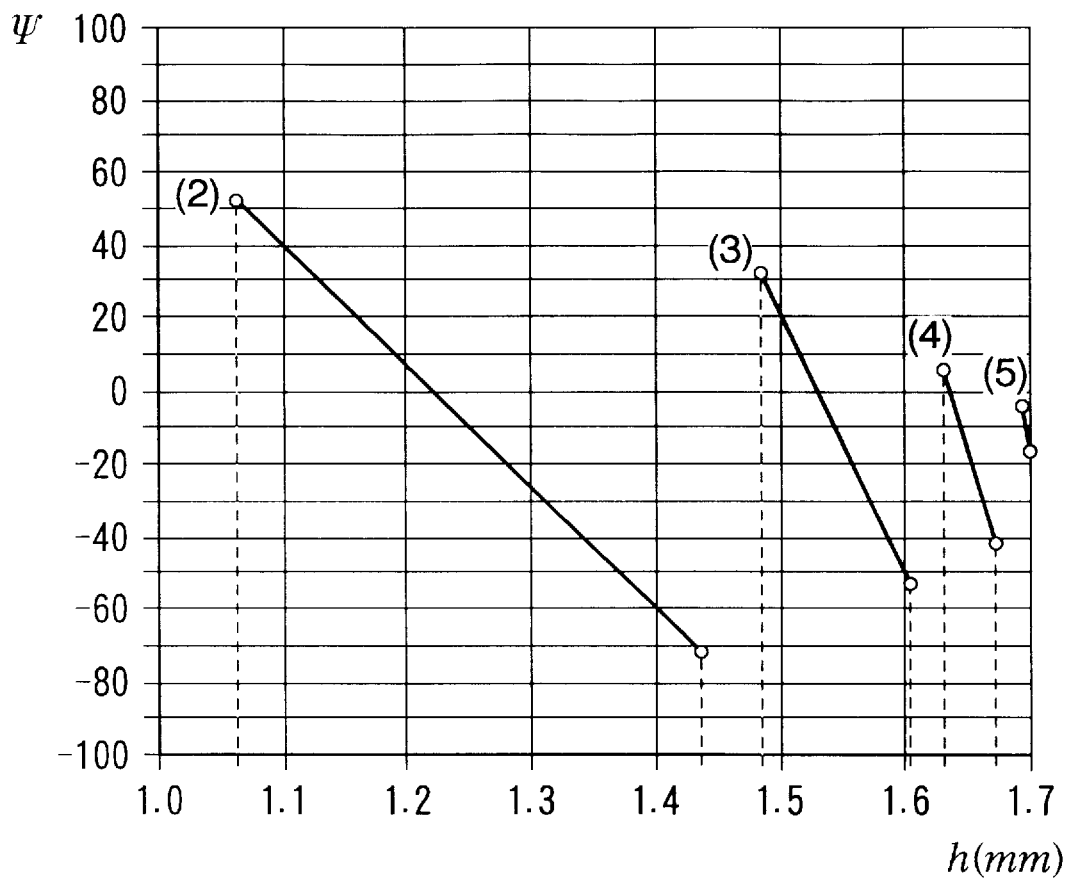
FIG. 7 is a graph illustrating a relationship between an incident height and an emitting angle when an incident angle is approximately twenty degrees.

As described above (in the Background), a portion of the light beam P also passes through the lens portion 2 and a portion of this portion is reflected at a second surface 2B of the lens. portion 2. In this embodiment, since the first angle $\omega 2$ is -20 degrees and the inclination angle $\theta$ of the lens 1 is small, an incident angle $\phi$ of the light beam P on the lens portion 2 is approximately 20 degrees. For this particular example, as shown in FIG. 7, for an incident height in a range of 1.06 mm through 1.44 mm, the relevant portion of the light beam is reflected twice by the second surface 2B and is emitted at an emitting angle $\Psi$ in a range of 50 to -70 degrees. For an incident height h in a range of 1.48 mm through 1.60 mm, the beam is reflected three times and the emitting angle $\Psi$ is in a range of 30 to -50 degrees. For an incident height h in a range of 1.64 mm through 1.68 mm, the beam is reflected four times and the emitting angle $\Psi$ is in a range of 6 to -40 degrees.

Figure 1:
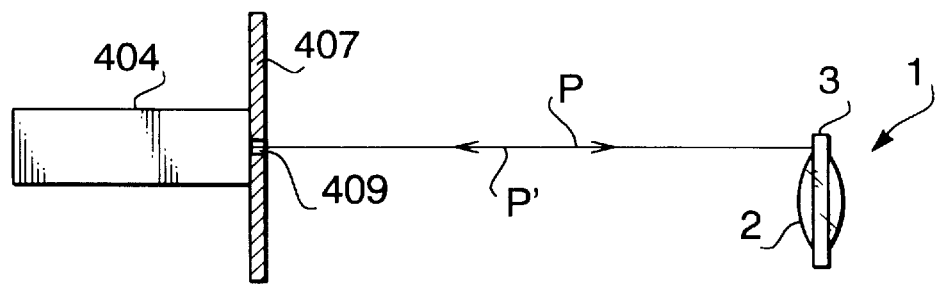
FIG. 1 is a schematic side view of a conventional inclination monitoring system of a lens inclination adjusting apparatus.
Figure 2:
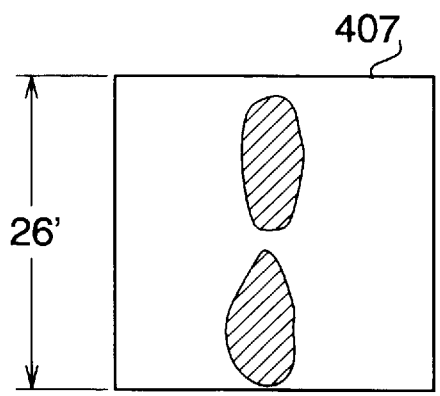
FIG. 2 is an example of an image formed on a screen in the conventional inclination monitoring system shown in FIG. 1.
Figure 3:
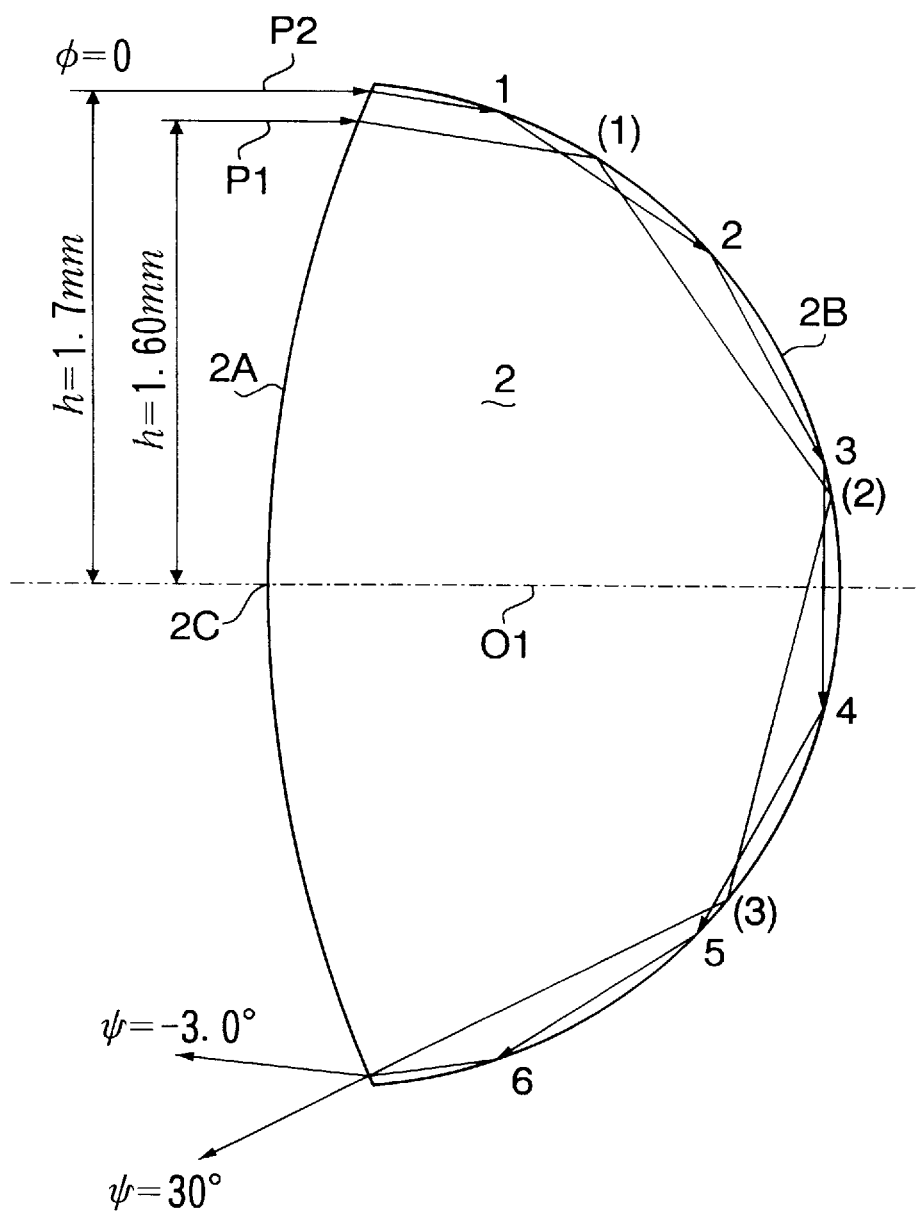
FIG. 3 is an enlarged side view of an objective lens shown in FIG. 1.
Figure 4:
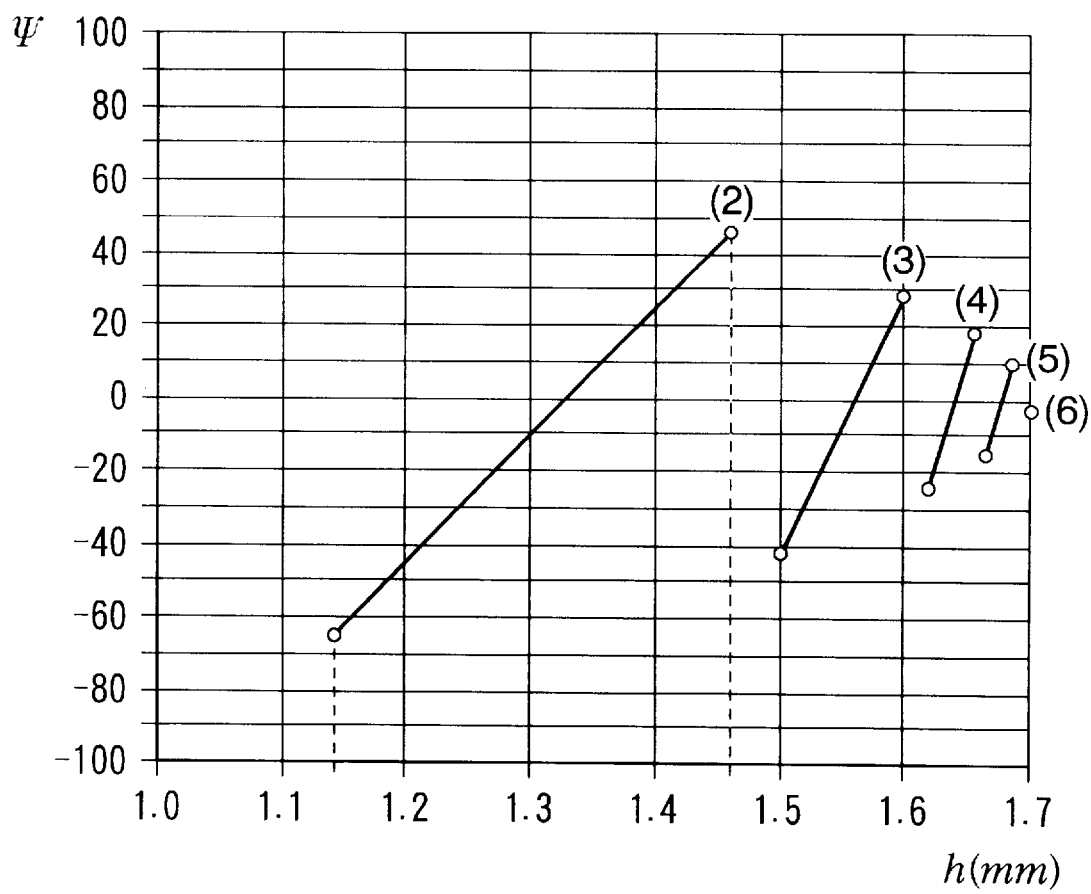
FIG. 4 is a graph illustrating a relationship between an incident height and an emitting angle when an incident angle is approximately zero degrees.

Thus, in this embodiment, no beams are reflected by the second surface 2B six times, and further, the emitting angle ranges of the beams reflected five times, four times, three time and twice are all offset towards the negative side in comparison to the characteristics shown in FIG. 4. As shown in FIG. 7, since the second angle $\omega 2$ is 20 degrees, only the beams reflected two and three times will have an emitting angle $\Psi$ directed to the light receiving system 300. Thus, the stray light due to the total reflection by the second surface 2B and the light reflected by the flange portion 3 can be effectively separated.

Further to the above, the diameter of the incident beam P is designed to be relatively large with respect to the diameter of the flange portion 3 of the objective lens 1. It is known that the radius of a beam waist W0 is expressed as follows:

$$W0 = \lambda f / \pi W$$

where $\lambda$ is the wavelength of the beam, f is the focal length of the lens (in this case, the collimating lens 30), and W is the radius of the beam incident to the lens (in this case, the collimating lens 30). As understood from the formula above, if the radius W of the incident beam is larger, the diameter of the beam waist W0 is smaller.

Figure 8:
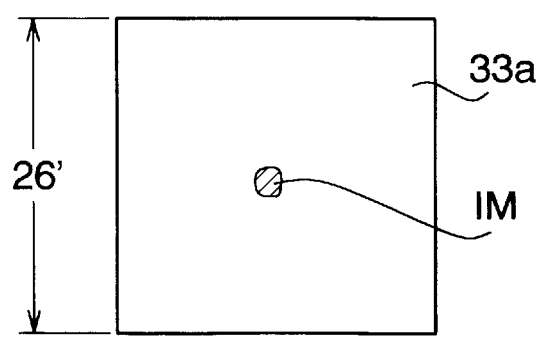
FIG. 8 shows an imaging device and a spot image formed on the imaging device.

Further, it is also known that, if the central area, in cross section, of the incident beam is obscured, the beam waist becomes smaller. In the present embodiment, since the beam P is projected to the entire surface of the objective lens 1, the beam reflected from the flange portion 3 and incident to the lens 30 has a relatively large diameter. Further, due to the scattering of light by the lens portion 2, the central portion thereof is obscured. In such a case, i.e., when a beam has an annular cross section, the beam converged by the collimating lens 30 has a smaller size than in a case where the beam has a circular cross section. This effect is known as a superresolution effect. Accordingly, the size of the spot image IM formed on the imaging device 33 is relatively small in size as shown in FIG. 8. Therefore, the inclination of the objective lens 1 can be monitored accurately.

The inclination of the objective lens 1 with respect to the recording medium is adjusted as described below.

Figure 9:
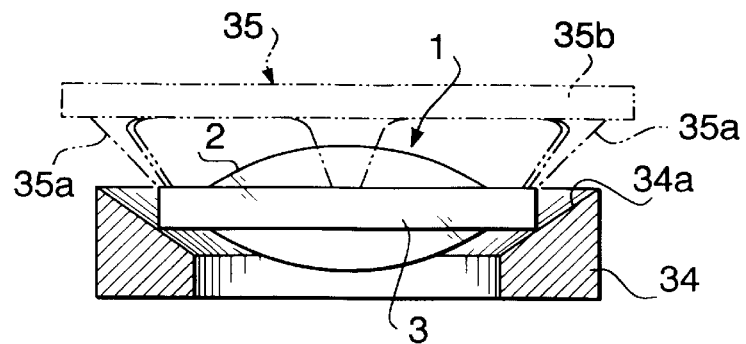
FIG. 9 is a side view of the objective lens of FIG. 6, a lens holder, and a jig used for adjusting the inclination of the objective lens.
Figure 10:
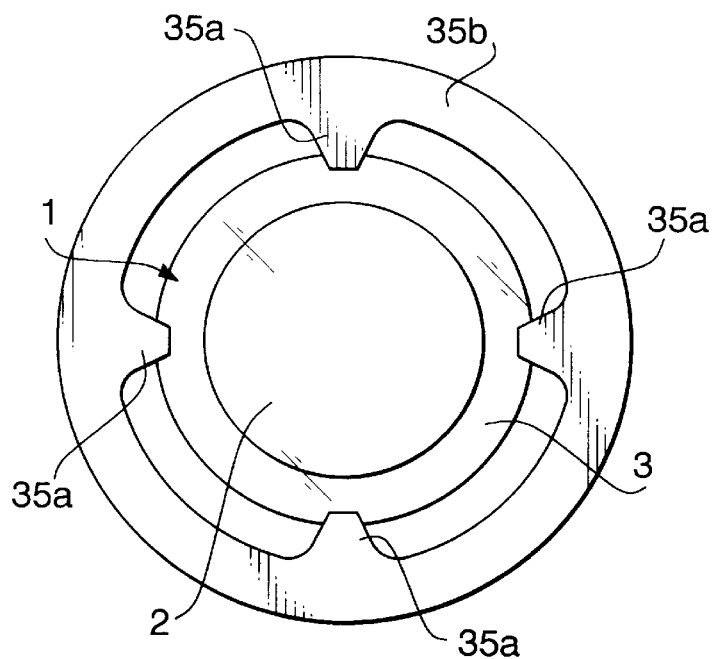
FIG. 10 is a top view of the lens and the jig of FIG. 9.

As shown in FIGS. 9 and 10, the objective lens 1 is mounted on a lens holder 34. Specifically, an outer edge of the flange portion 3 is supported on a sloping surface 34a of the lens holder 34. A jig 35 is placed on the objective lens 1 to allow the inclination of the objective lens 1 to be changed. The jig 35 includes a plurality of legs 35a and a mirror surface 35b. The legs 35a abut the flange portion 3 of the objective lens 1 and the inclination of the objective lens 1 is adjusted by known operation of the jig 35. An example of a mechanism for adjusting the inclination of the objective lens 1 is disclosed in U.S. Pat. No. 5,553,052, the teachings of which are incorporated herein by reference in its entirety.

Figure 11:
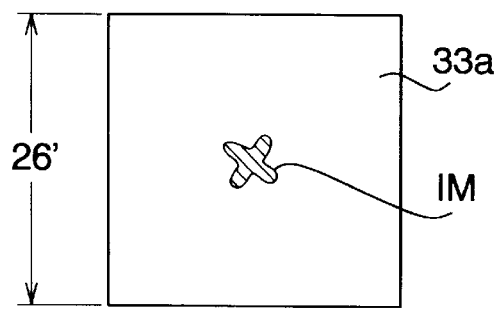
FIG. 11 shows an image formed on the imaging device when the jig of FIG. 10 is used.

Due to the legs 35a, a part of the beam reflected by the flange portion 3 is obscured. Further, a diffraction effect occurs, which distorts the shape of the spot image IM on the imaging device 33 slightly as shown in FIG. 11. Even though the spot image is distorted, the size of the spot is still sufficiently small to allow accurate detection of the inclination of the objective lens 1.

After the inclination of the objective lens 1 is adjusted, the inclination of the objective lens 1 is reexamined using the interferometer. If the inclination has been correctly adjusted, i.e., is within the allowable range, the objective lens is fixedly secured on the sloping surface 34a with an adhesive agent (not shown) or the like. In this embodiment, a UV (ultraviolet) hardening adhesive agent (not shown) is utilized. The UV hardening adhesive agent initially has a predetermined viscosity, and when illuminated with a UV light, hardens.

In practice, the lens is placed on the sloping surface 34a, the UV hardening adhesive agent is applied, and then the inclination is adjusted. After the inclination is adjusted, UV light is projected to the lens holder 34 so that the UV hardening adhesive agent is hardened and the object lens is fixedly secured.

It should be noted that the beam reflected by the second surface 2B is emitted from the first surface 2A as diverging light, and accordingly, if the light receiving system 300 is positioned further away from the objective lens 1, noise due to stray light (i.e., the totally reflected light) can be reduced.

According to the inclination monitoring system described above, the size of the image formed by the objective lens 1 is made sufficiently small, for example, approximately 3 minutes of arc, and accordingly the inclination of the objective lens can be monitored accurately. Further, stray light, which is caused due to a part of light incident to the objective lens being totally reflected inside the lens, is sufficiently reduced so as not to cause difficulties in monitoring the inclination status.

Although the structure and operation of a lens inclination monitoring system is described herein with respect to the preferred embodiments, many modifications and changes can be made without departing from the spirit and scope of the invention.

The present disclosure relates to subject matter contained in Japanese Patent Application No. HEI 8-220890, filed on Aug. 22, 1996, which is expressly incorporated herein by reference in its entirety.

What is claimed is:

1. An inclination monitoring system for monitoring an inclination of a lens with respect to a reference plane, said lens having a lens portion and a flange portion surrounding said lens portion, said inclination monitoring system comprising:

a light emitting system which emits a collimated light beam towards said lens, an optical axis of said light emitting system forming a first predetermined angle with a normal to said reference plane, said collimated light beam being incident on an entire area of said flange portion; and a light receiving system which receives light reflected by said lens, said light receiving system arranged in a predetermined positional relationship with respect to said light emitting system and said reference plane.

2. The inclination monitoring system according to claim 1, wherein said first predetermined angle is greater than a predetermined allowable inclination range of said lens with respect to said reference plane.

3. The inclination monitoring system according to claim 1, wherein an optical axis of said light receiving system forms a second predetermined angle with said normal to said reference plane.

4. The inclination monitoring system according to claim 3, wherein said second predetermined angle and said first predetermined angle are substantially the same.

5. The inclination monitoring system according to claim 1, wherein said light emitting system and said light receiving system are arranged such that optical axes of said light emitting system and said light receiving system are arranged symmetrically with respect to said normal to said reference plane.

6. The inclination monitoring system according to claim 1, wherein said light receiving system includes an image receiving device and a collimating lens, said collimating lens being arranged between said lens and said image receiving device to converge said light reflected by said lens onto said image receiving device.

7. The inclination monitoring system according to claim 6, said image receiving system further comprising an analyser and an ND (neutral density) filter.

8. The inclination monitoring system according to claim 7, said analyser and said ND filter being arranged between said collimating lens and said image receiving device.

9. The inclination monitoring system according to claim 1, wherein said image receiving device includes an image receiving surface and wherein said inclination of said lens is monitored by comparing a first position of the received light on said image receiving surface when said lens has a first inclination with another position of the received light on said image receiving surface when said lens has a second inclination.

10. An inclination monitoring system for monitoring an inclination of a lens with respect to a reference plane, said lens having a lens portion and a flange portion surrounding said lens portion, said inclination monitoring system comprising:

a light emitting system which emits a collimated light beam towards said lens; and a light receiving system which receives light reflected by said lens, wherein said light emitting system, said reference plane, said lens, and said light receiving system are arranged such that an amount of light totally internally reflected by said lens that is incident to said light receiving system is reduced.

* * * * *

UNITED STATES PATENT AND TRADEMARK OFFICE
CERTIFICATE OF CORRECTION

PATENT NO. : 5,883,709
DATED : March 16, 1999
INVENTOR(S) : Okuda et al

It is certified that error appears in the above-indentified patent and that said Letters Patent is hereby corrected as shown below:

On the title page, insert --[*] Notice: The portion of the term of this patent subsequent to July 24, 2017 has been disclaimed--.

Signed and Sealed this

Twenty-third Day of November, 1999

Attest:

Q. TODD DICKINSON

*Attesting Officer*      *Acting Commissioner of Patents and Trademarks*